United States Patent
Ikitake (10) Patent No.: US 10,439,349 B2
(45) Date of Patent: Oct. 8, 2019

(54) ROTOR FOR BRUSH MOTOR AND ON-VEHICLE BRUSH MOTOR

(71) Applicant: MITSUBISHI ELECTRIC CORPORATION, Tokyo (JP)

(72) Inventor: Yoshitaka Ikitake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 15/544,800

(22) PCT Filed: Mar. 4, 2015

(86) PCT No.: PCT/JP2015/056363
§ 371 (c)(1),
(2) Date: Jul. 19, 2017

(87) PCT Pub. No.: WO2016/139777
PCT Pub. Date: Sep. 9, 2016

(65) Prior Publication Data
US 2018/0019560 A1 Jan. 18, 2018

(51) Int. Cl.
*H01R 39/04* (2006.01)
*H01R 39/32* (2006.01)
(Continued)

(52) U.S. Cl.
CPC ............ *H01R 39/32* (2013.01); *H02K 1/24* (2013.01); *H02K 1/28* (2013.01); *H02K 3/18* (2013.01);
(Continued)

(58) Field of Classification Search
CPC . H01R 39/32; H02K 3/28; H02K 3/38; H02K 3/18; H02K 5/24; H02K 11/20; H02K 1/24; H02K 1/28
(Continued)

(56) References Cited

U.S. PATENT DOCUMENTS 6,694,599 B1 * 2/2004 Kershaw ............ H01R 39/32
29/597
2004/0155550 A1 8/2004 Yamamoto et al.
(Continued)

FOREIGN PATENT DOCUMENTS

GB 2 141 590 A 12/1984
JP 58-108950 * 6/1983 ............ H02K 23/26
(Continued)

OTHER PUBLICATIONS

Office Action issued in corresponding Chinese Application No. 201580077011.2 dated Oct. 31, 2018.
(Continued)

*Primary Examiner* — Hanh N Nguyen
(74) *Attorney, Agent, or Firm* — Birch, Stewart, Kolasch & Birch, LLP (57) ABSTRACT

A rotor includes coils that are formed by winding wires around bobbins of a core, terminals which are arranged on the bobbins and to which end portions of the wires are hooked, and a commutator arranged at an end portion of the core on a side where the terminals are arranged. The terminals and commutator segments of the commutator are electrically connected via metal pieces extending from the commutator segments and via a wiring board.

11 Claims, 12 Drawing Sheets

(51) Int. Cl.
  *H02K 23/26* (2006.01)
  *H02K 11/20* (2016.01)
  *H02K 1/24* (2006.01)
  *H02K 1/28* (2006.01)
  *H02K 3/18* (2006.01)
  *H02K 3/28* (2006.01)
  *H02K 3/38* (2006.01)
  *H02K 5/24* (2006.01)
  *H02K 3/52* (2006.01)
  *H02K 11/028* (2016.01)
  *H02K 13/04* (2006.01)
  *H02K 13/10* (2006.01)

(52) U.S. Cl.
  CPC ............... *H02K 3/28* (2013.01); *H02K 3/38* (2013.01); *H02K 3/527* (2013.01); *H02K 5/24* (2013.01); *H02K 11/028* (2013.01); *H02K 11/20* (2016.01); *H02K 13/04* (2013.01); *H02K 13/105* (2013.01); *H02K 23/26* (2013.01); *H02K 2211/03* (2013.01)

(58) Field of Classification Search
  USPC .................. 310/230, 231, 232, 233, 234
  See application file for complete search history.

(56) References Cited

U.S. PATENT DOCUMENTS

2005/0206264 A1* 9/2005 Yamamoto ............. H01R 39/32
                                                                310/216.001
2007/0170807 A1     7/2007 Nakano et al.

FOREIGN PATENT DOCUMENTS

| JP | 59-209041 A  | 11/1984 |
| JP | 4-134173 U   | 12/1992 |
| JP | 2004-242442 A | 8/2004 |
| JP | 2005-265536 A | 9/2005 |
| JP | 2006-67773 A  | 3/2006 |
| JP | 2007-181275 A | 7/2007 |
| JP | 2012-39681 A  | 2/2012 |

OTHER PUBLICATIONS

Office Action issued in corresponding Chinese Application No. 201580077011.2 dated Jul. 4, 2019.

* cited by examiner

ROTOR FOR BRUSH MOTOR AND ON-VEHICLE BRUSH MOTOR

TECHNICAL FIELD

The present invention relates to brush motors, in particular, to a rotor for a brush motor.

BACKGROUND ART

A rotor for a brush motor includes coils that are formed by winding wires around bobbins of a core, and a commutator that rotates integrally with the core. Each wire of the coils is electrically connected to commutator segments of the commutator, and an electric current flows through the coil when electric power is supplied to the commutator segments via so-called "brushes". When an electric current flows through a coil, the coil generates a magnetic field. Magnetic forces among the coils of the rotor and magnets disposed on the stator cause the rotor to rotate with respect to the stator.

In general, in a rotor for a brush motor, wires are fixed to and electrically connected to commutator segments by engaging (so-called "hooking") the end portions of the wires drawn out from the bobbins with the commutator segments. For example, in a rotor disclosed in Patent Literature 1, an engaging claw is provided on each commutator segment, and an armature wire is fused to an engaging claw in a state in which the engaging claw is bent to clamp the armature wired. Thereby, the armature wire is fixed to and electrically connected to the commutator segment.

CITATION LIST

Patent Literature

Patent Literature 1: Japanese Unexamined Utility Model Application Publication No. H04-134173

SUMMARY OF INVENTION

Technical Problem

In the conventional rotor for the brush motor, the end portions of a wire of a coil are hooked to commutator segments in a state in which the end portions of the wire are drawn out from the bobbins to the commutator. Thus, there is a problem that the length of the drawn portion of the wires is long, causing the wires to break due to inertial force during rotation of the rotor. There is another problem that a difference between a resonant state of the core and a resonant state of the commutator induced by vibration of the rotor causes the drawn wires to break.

The present invention has been made to solve the problems above, and it is an object of the present invention to provide a rotor for a brush motor that can reduce the occurrence of breakage of wires, and an on-vehicle brush motor that uses such a rotor for a brush motor.

Solution to Problem

A rotor for a brush motor in accordance with the present invention includes: a plurality of coils formed by winding wires around bobbins of a core; a plurality of terminals provided on one of the bobbins, wherein an end portion of each wire is hooked to each of the plurality of terminals; and a commutator arranged at an end portion of the core on a side where the terminals are provided, wherein the terminals and commutator segments of the commutator are electrically connected via metal pieces extending from the commutator segments and a wiring board.

Advantageous Effects of Invention

In the rotor for the brush motor in accordance with the present invention, the wires are hooked to the terminals arranged on the bobbins, and the terminals and the commutator segments are electrically connected via the metal pieces extending from the commutator segments and via the wiring board. Thereby, it is possible to eliminate the necessity of drawing out the wires from the bobbins to the commutator, and reduce the likelihood of breakage of the wires.

DESCRIPTION OF EMBODIMENTS

Hereinafter, to explain the present invention in more detail, embodiments of the present invention will be explained with reference to the attached drawings.

Embodiment 1

A rotor 200 of the present invention is integrally made of a core 1 on which coils 3a-3f are wound, a commutator 6, and a shaft 7 by insert molding. Hereinafter, with reference to FIGS. 1 to 7, a state before insert molding will be explained.

Figure 1:
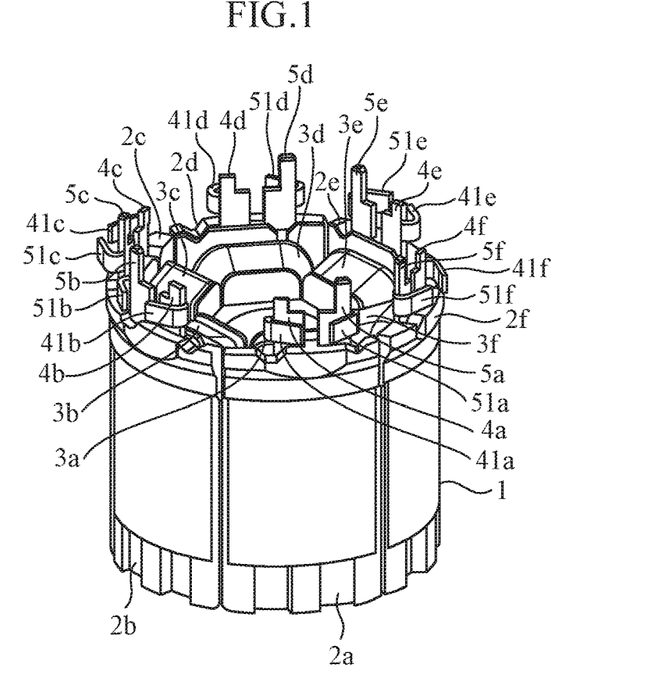
FIG. 1 is a perspective view of a core, bobbins, and coils in accordance with Embodiment 1 of the present invention.
Figure 2:
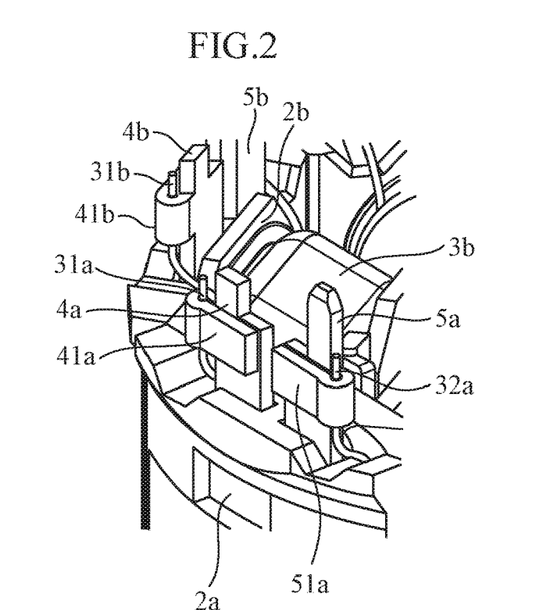
FIG. 2 is an enlarged view of a portion including a first terminal and a second terminal shown in FIG. 1.
Figure 3:
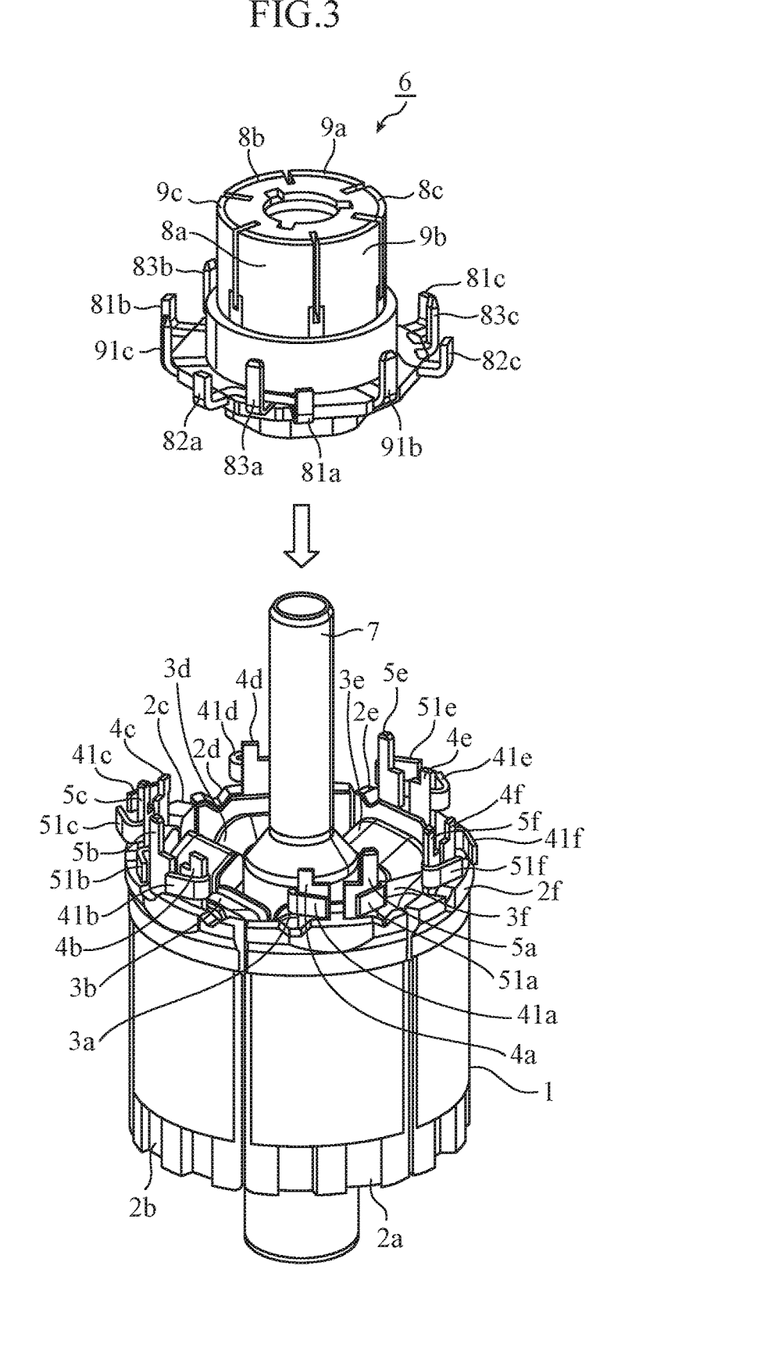
FIG. 3 is a perspective view of the core, the bobbins, the coils, a commutator, and a shaft in accordance with Embodiment 1 of the present invention.
Figure 4:
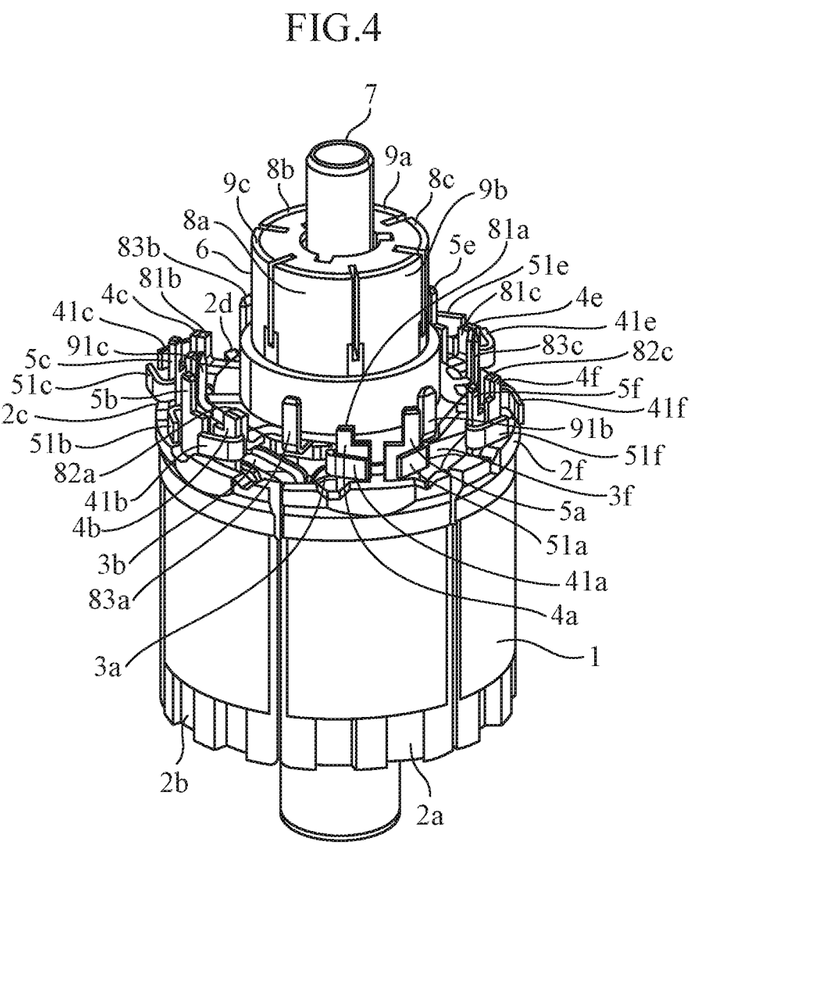
FIG. 4 is a perspective view for illustrating a state in which the shaft penetrates through the commutator shown in FIG. 3.
Figure 5:
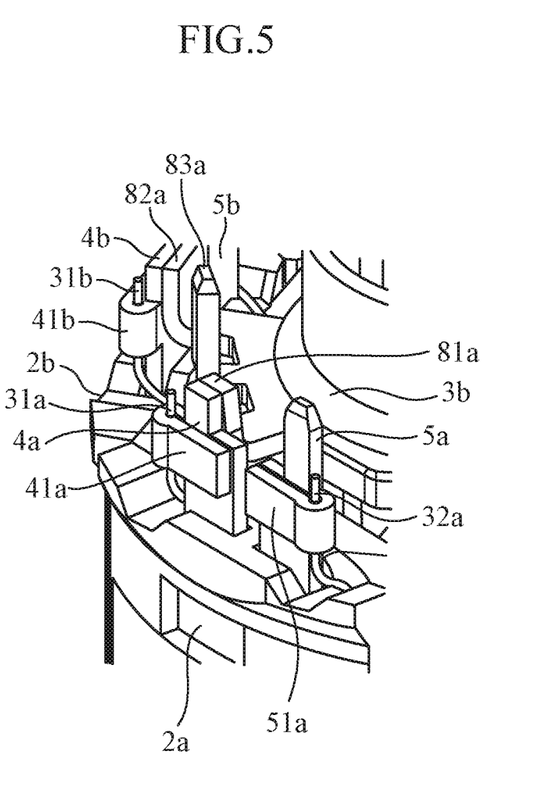
FIG. 5 is an enlarged view of a portion including the first terminal and a first metal piece shown in FIG. 4.
Figure 6:
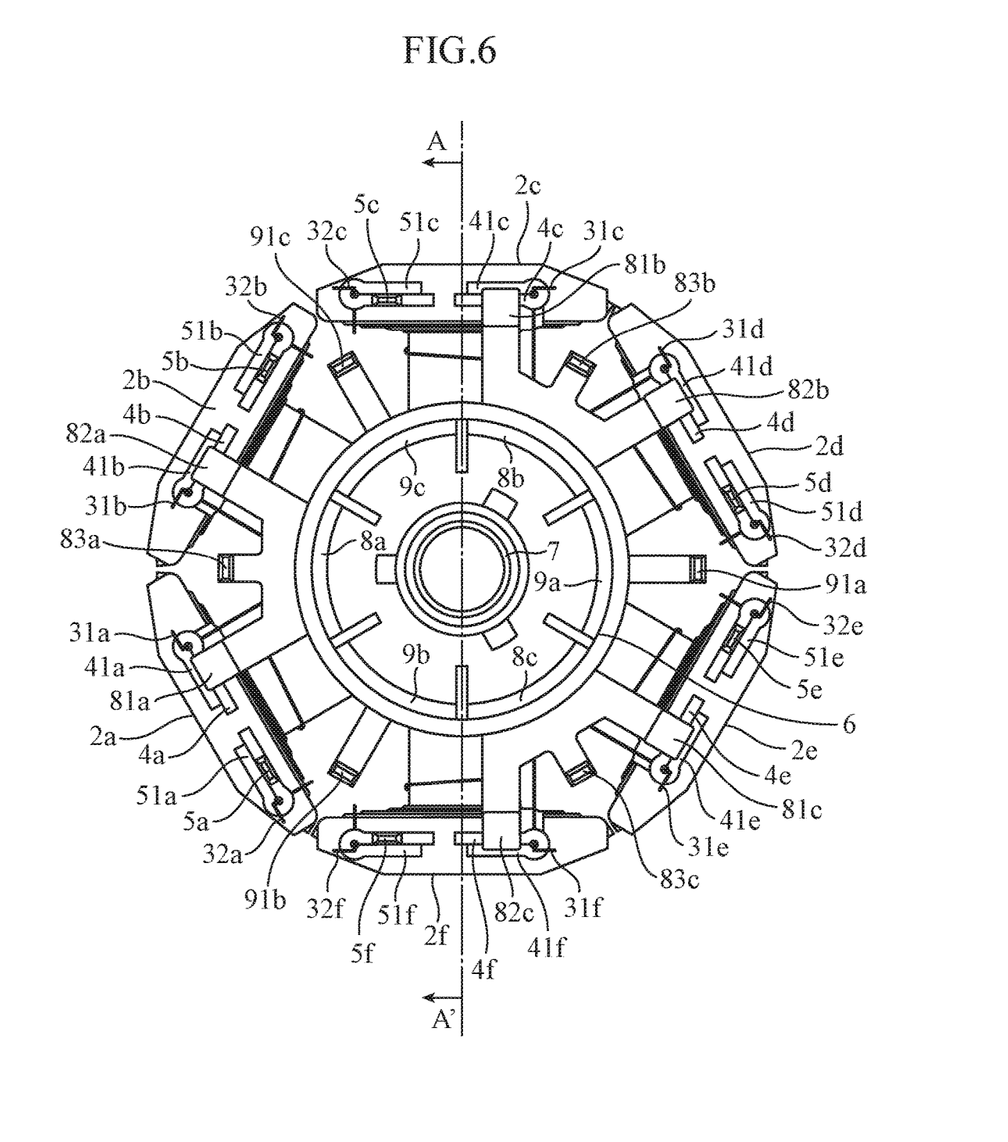
FIG. 6 is a plan view of the core, the bobbins, the coils, the commutator, and the shaft shown in FIG. 4.
Figure 7:
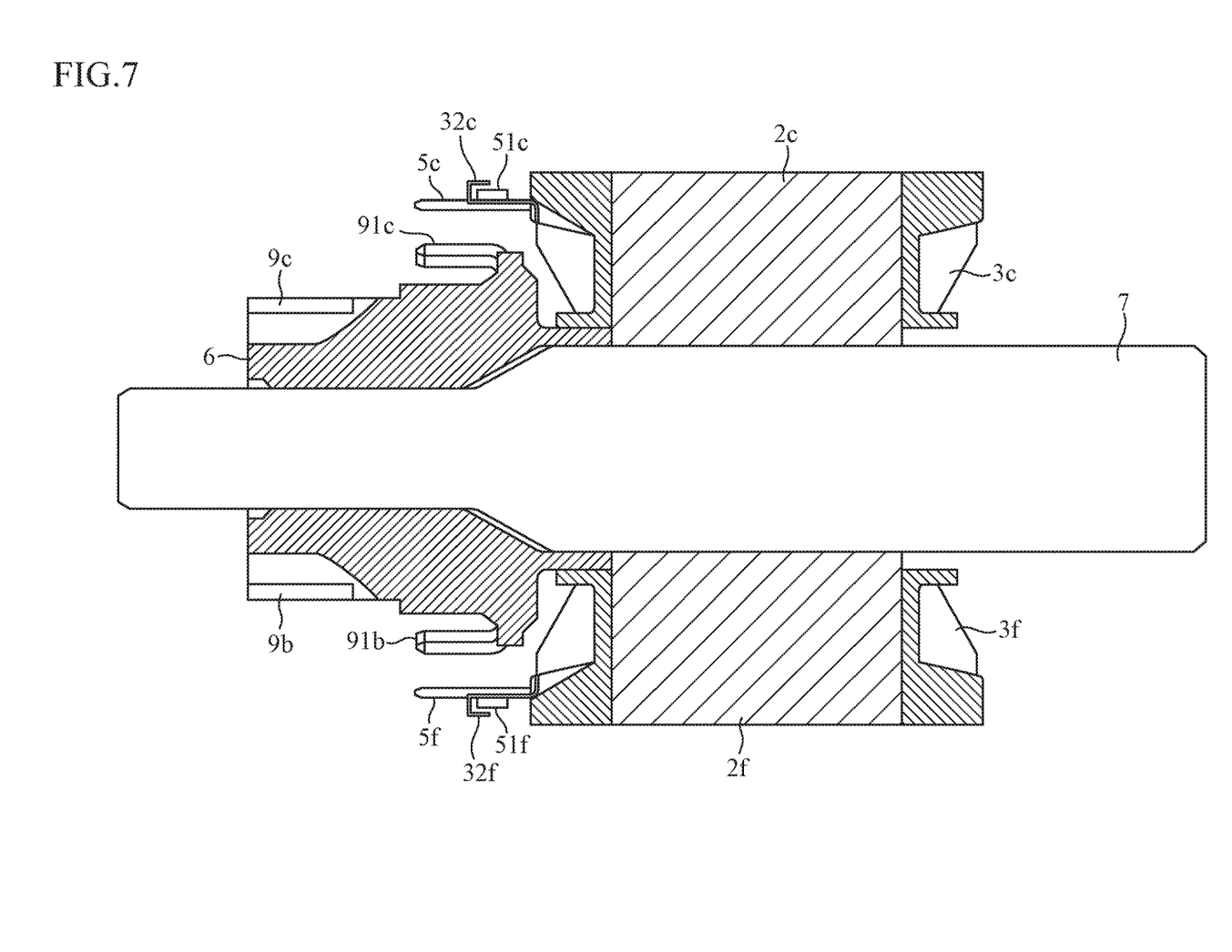
FIG. 7 is a cross-sectional view taken along a line A-A' shown in FIG. 6.

FIG. 1 is a perspective view of the core 1, bobbins 2a-2f, and the coils 3a-3f. FIG. 2 is an enlarged view of a portion including a first terminal 4a and a second terminal 5a shown in FIG. 1. FIG. 3 is a perspective view of the core 1, the bobbins 2a-2f, the coils 3a-3f, the commutator 6, and the shaft 7. FIG. 4 is a perspective view for illustrating a state in which the shaft 7 penetrates through the commutator 6 shown in FIG. 3. FIG. 5 is an enlarged view of a portion including the first terminal 4a and a first metal piece 81a shown in FIG. 4. FIG. 6 is a plan view of the core 1, the bobbins 2a-2f, the coils 3a-3f, the commutator 6, and the shaft 7 shown in FIG. 4. FIG. 7 is a cross-sectional view taken along a line A-A' shown in FIG. 6.

Note that FIGS. 1, 3, and 4 illustrate a state before fusing wires of the coils 3a-3f to first terminals 4a-4f and second terminals 5a-5f. Also note that, in FIG. 6, as for the coils 3a-3f, only one end portions 31a-31f and the other end portions 32a-32f of the wires are shown.

The core 1 is made from laminated steel plates, and has six teeth. By covering each tooth with an insulator made of, for example resin, the bobbins 2a-2f are formed. Individual wires are wound around bobbins 2a-2f, and coils 3a-3f of so-called "concentrated winding" are constituted.

At an end of the bobbin 2a, there are provided a first terminal 4a and a second terminal 5a. The first terminal 4a and the second terminal 5a are made of pure copper, and the first terminal 4a is shorter in length than the second terminal 5a.

The first terminal 4a is provided with a hook 41a. The hook 41a has a shape that is capable of clamping a linear member flexibly. As shown in FIG. 2, the end portion 31a of the wire of the coil 3a is fixed to the hook 41a by fusing, with the end portion 31a clamped by the hook 41a. The second terminal 5a is provided with a hook 51a. The hook 51a has a shape that is capable of clamping a linear member flexibly. The other end portion 32a of the wire of the coil 3a is fixed to the hook 51a by fusing, with the other end portion 32a clamped by the hook 51a.

Similarly, at each end of the bobbins 2b-2f, there are provided a corresponding first terminal 4b-4f and second terminal 5b-5f. One end portions 31b-31f of the wires of the coils 3b-3f are hooked to hooks 41b-41f of the first terminals 4b-4f, respectively, and are fixed to the hooks 41b-41f by fusing. The other end portions 32b-32f of the wires of the coils 3b-3f are hooked to hooks 51b-51f of the second terminals 5b-5f, respectively, and are fixed to the hooks 51b-51f by fusing.

As shown in FIGS. 3 and 4, the commutator 6 having a generally cylindrical shape is arranged at an end portion of the core 1 on a side at which the first terminals 4a-4f and the second terminals 5a-5f are arranged. The commutator 6 has an internal space that communicates with an internal space formed in the core 1, and the shaft 7 passes through both internal spaces.

On a side peripheral portion of the commutator 6, three first commutator segments 8a-8c and three second commutator segments 9a-9c are alternately arranged with a space provided therebetween. That is, the first commutator segment 8a and the second commutator segment 9a are opposed to each other via the shaft 7, the first commutator segment 8b and the second commutator segment 9b are opposed to each other via the shaft 7, and the first commutator segment 8c and the second commutator segment 9c are opposed to each other via the shaft 7.

The first commutator segment 8a includes a pair of first metal pieces 81a, 82a that extend toward a direction from a central portion of the commutator 6 to the outer peripheral portion. Each first metal piece 81a, 82a is bent toward an axial direction of the shaft 7 at a substantially right angle to form an L-shape. The tip of the first metal piece 81a, which is one of the first metal pieces, is in contact with the first terminal 4a as shown in FIG. 5. The first metal piece 81a is made of pure copper, and is fixed to the first terminal 4a by, for example, TIG (Tungsten Inert Gas) welding. Similarly, the first metal piece 82a, which is the other of the first metal pieces, is made of pure copper, and the tip of the first metal piece 82a is in contact with the first terminal 4b and fixed to the first terminal 4b by, for example, TIG welding.

Moreover, the first commutator segment 8a includes a second metal piece 83a made of pure copper between the first metal pieces 81a, 82a. The second metal piece 83a is bent toward an axial direction of the shaft 7 at a substantially right angle to form an L-shape.

Similarly, the first commutator segment 8b includes a pair of first metal pieces 81b, 82b. The first metal piece 81b, which is one of the first metal pieces, is fixed to the first terminal 4c. The first metal piece 82b, which is the other of the first metal pieces, is fixed to the first terminal 4d. In addition, the first commutator segment 8b includes a second metal piece 83b having an L-shape between the first metal pieces 81b, 82b.

Similarly, the first commutator segment 8c includes a pair of first metal pieces 81c, 82c. The first metal piece 81c, which is one of the first metal pieces, is fixed to the first terminal 4e. The first metal piece 82c, which is the other of the first metal pieces, is fixed to the first terminal 4f. In addition, the first commutator segment 8c includes a second metal piece 83c having an L-shape between the first metal pieces 81c, 82c.

The second commutator segment 9a includes a second metal piece 91a that is made of pure copper and that extend toward a direction from the central portion of the commutator 6 to the outer peripheral portion. The second metal piece 91a is bent toward an axial direction of the shaft 7 at a substantially right angle to form an L-shape. Similarly, the second commutator segments 9b, 9c respectively include second metal pieces 91b, 91c having an L-shape.

Next, with reference to FIGS. 8 to 12, a state after forming the core 1, the commutator 6, and the shaft 7 integrally by insert molding will be explained.

Figure 8:
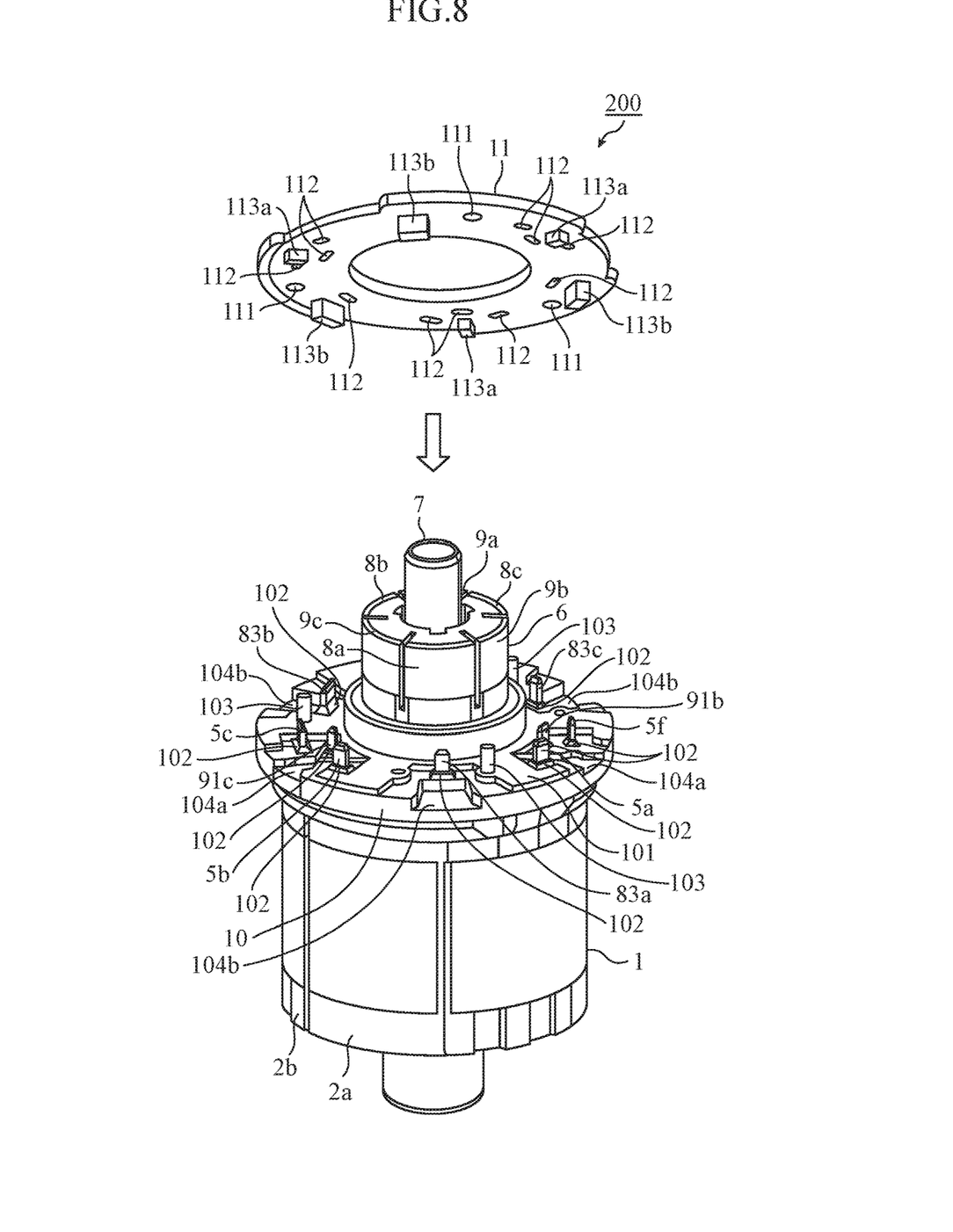
FIG. 8 is a perspective view of a rotor in accordance with Embodiment 1 of the present invention.
Figure 9:
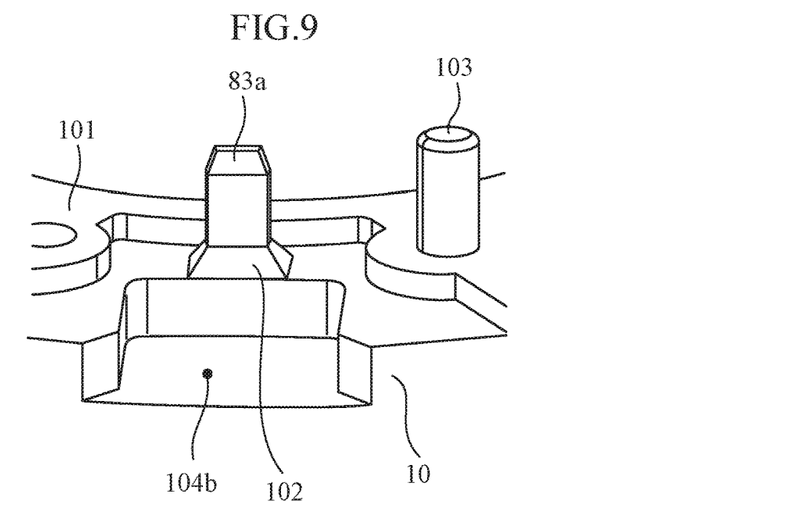
FIG. 9 is an enlarged view of a portion including a wiring board mounting surface shown in FIG. 8.
Figure 10:
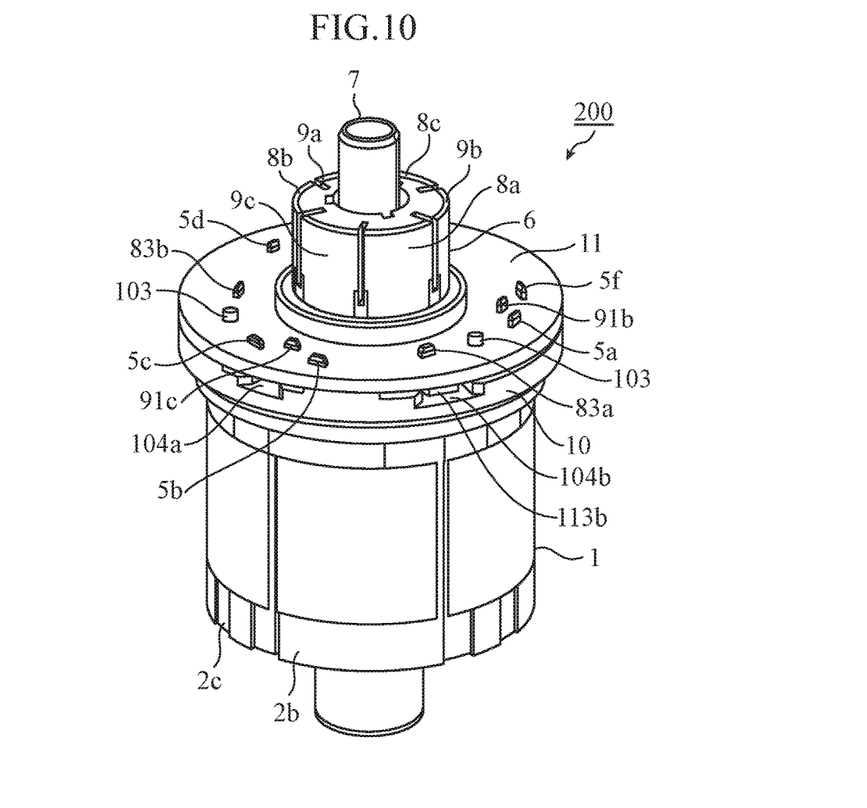
FIG. 10 is a perspective view for illustrating a state in which a wiring board shown in FIG. 8 is mounted on the wiring board mounting surface.
Figure 11:
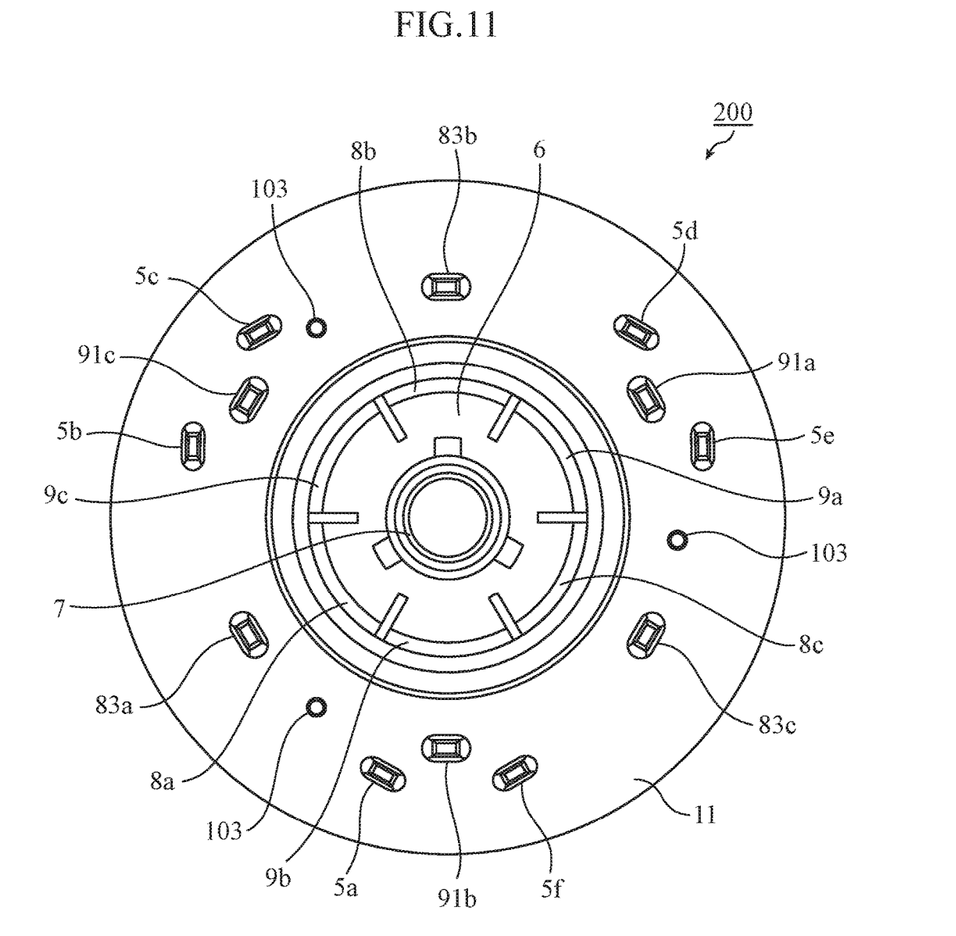
FIG. 11 is a plan view of the rotor shown in FIG. 10.
Figure 12:
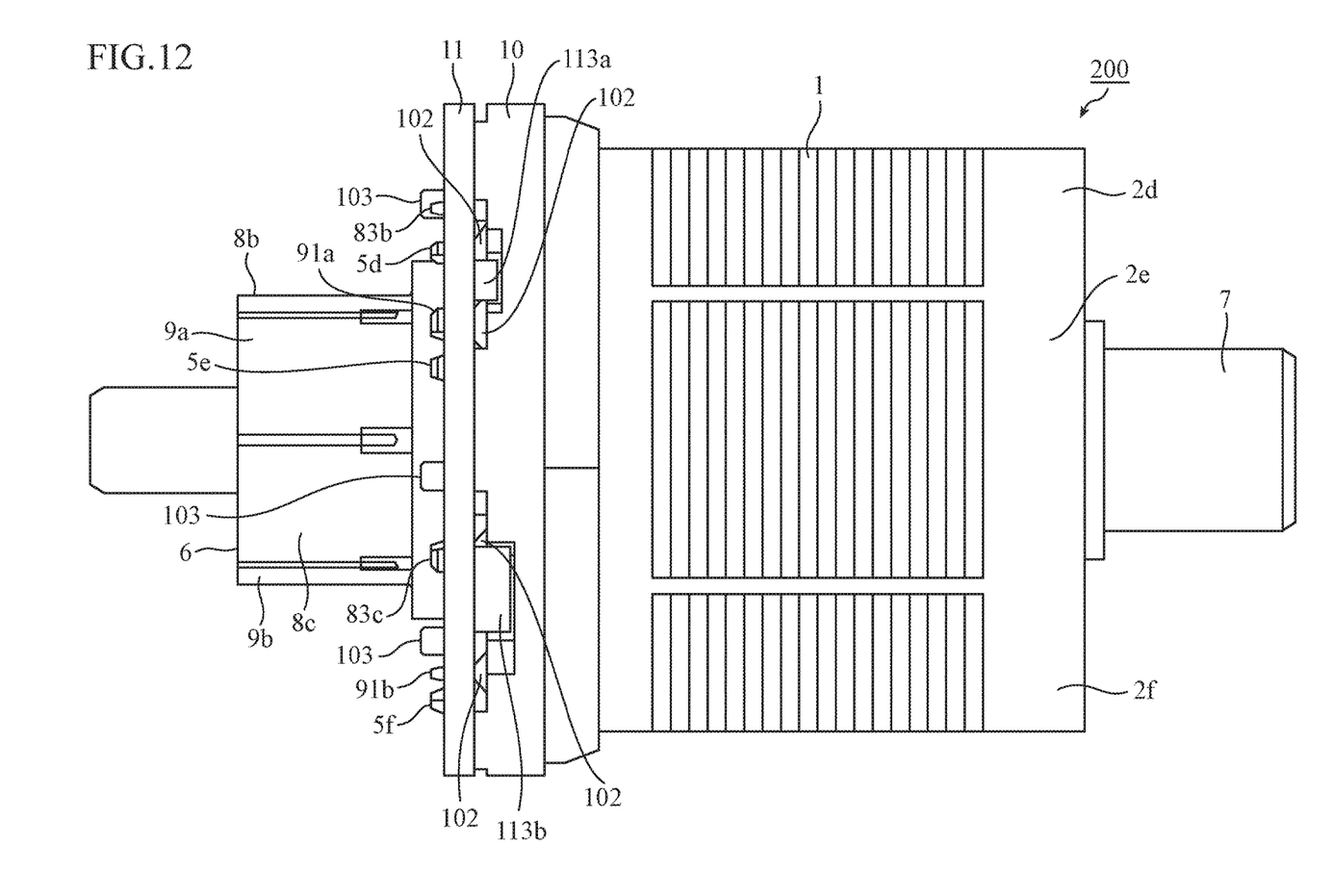
FIG. 12 is a side view of the rotor shown in FIG. 10.

FIG. 8 is a perspective view of the rotor 200, and illustrates a wiring board 11, and the rotor 200 without the wiring board 11. FIG. 9 is an enlarged view of a portion including a wiring board mounting surface 101 shown in FIG. 8. FIG. 10 is a perspective view for illustrating a state in which the wiring board 11 shown in FIG. 8 is mounted on the wiring board mounting surface 101. FIG. 11 is a plan view of the rotor 200 shown in FIG. 10. FIG. 12 is a side view of the rotor 200 shown in FIG. 10.

A resin molded portion 10, which has a substantially disc-shape and is made of resin used in the insert molding, is formed on an outer peripheral portion of a core-side end of the commutator 6. That is, the resin molded portion 10 is integrated with core 1 to cover a commutator-side end portion of the core 1.

The second terminals 5a-5f and the second metal pieces 83a-83c, 91a-91c penetrate through the resin molded portion 10, and individual tip portions thereof project from the wiring board mounting surface 101. Terminal blocks 102, which support the projecting tip portions of the second terminals 5a-5f and the second metal pieces 83a-83c, 91a-

91c, are formed on the wiring board mounting surface 101. In addition, the wiring board mounting surface 101 is provided with a plurality of cylindrical reference pins 103 and component placement recesses 104a, 104b.

The wiring board 11 is placed on the wiring board mounting surface 101. The wiring board 11 includes, for example, an electronic circuit board formed with laminated wiring layers. The wiring board 11 has a plurality of first through-holes 111, and the reference pins 103 of the resin molded portion 10 penetrate through the first through-holes 111, respectively. In addition, the wiring board 11 has a plurality of second through-holes 112, and the tip portions of the second terminals 5a-5f and the second metal pieces 83a-83c, 91a-91c are soldered to the wiring board 11 in a state in which the tip portions penetrate through corresponding second through-holes 112.

On a surface of the wiring board 11 facing the wiring board mounting surface 101, there is mounted a plurality of electronic components 113a, 113b. The electronic components 113a are, for example, resistance elements, and the electronic components 113b are, for example, capacitors. The electronic components 113a, 113b are mounted so as to be placed within the component placement recesses 104a, 104b of the resin molded portion 10, respectively, as shown in FIG. 10.

The second terminals 5a-5f, the second metal pieces 83a-83c, 91a-91c and the electronic components 113a, 113b are electrically connected through wiring in the wiring board 11. Hereinafter, with reference to FIGS. 6, 11 and 13, a specific example of the wiring in the wiring board 11, and an electrical connection state among the coils 3a-3f, the first commutator segments 8a-8c and the second commutator segments 9a-9c by such wiring will be explained.

Figure 13:
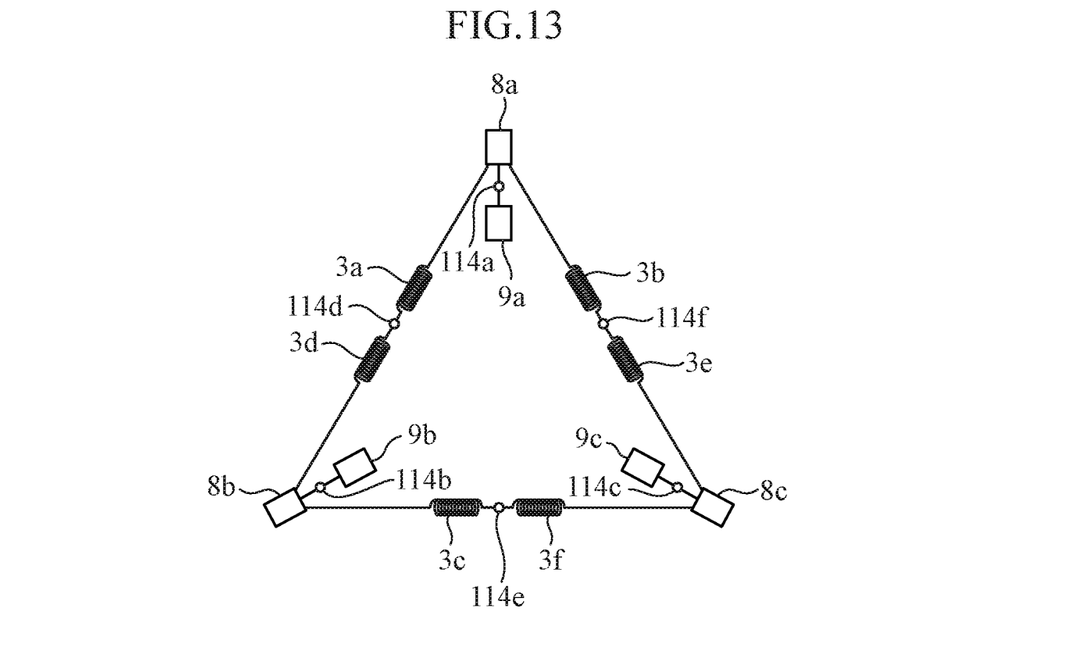
FIG. 13 is an explanatory diagram for illustrating an example of electrical connection among the coils and commutator segments in accordance with Embodiment 1 of the present invention.

By a line 114a in the wiring board 11, the second metal piece 83a and the second metal piece 91a are connected. That is, as shown in FIG. 13, the first commutator segment 8a and the second commutator segment 9a are electrically connected by the line 114a.

By a line 114b in the wiring board 11, the second metal piece 83b and the second metal piece 91b are connected. That is, as shown in FIG. 13, the first commutator segment 8b and the second commutator segment 9b are electrically connected by the line 114b.

By a line 114c in the wiring board 11, the second metal piece 83c and the second metal piece 91c are connected. That is, as shown in FIG. 13, the first commutator segment 8c and the second commutator segment 9c are electrically connected by the line 114c.

By a line 114d in the wiring board 11, the second terminal 5a and the second terminal 5d are connected. Here, the first metal piece 81a is welded to the first terminal 4a, and the first metal piece 82b is welded to the first terminal 4d. Thus, as shown in FIG. 13, a state in which two coils 3a, 3d are connected in series between the first commutator segments 8a, 8b is established.

By a line 114e in the wiring board 11, the second terminal 5c and the second terminal 5f are connected. Here, the first metal piece 81b is welded to the first terminal 4c, and the first metal piece 82c is welded to the first terminal 4f. Thus, as shown in FIG. 13, a state in which two coils 3c, 3f are connected in series between the first commutator segments 8b, 8c is established.

By a line 114f in the wiring board 11, the second terminal 5e and the second terminal 5b are connected. Here, the first metal piece 81c is welded to the first terminal 4e, and the first metal piece 82a is welded to the first terminal 4b. Thus, as shown in FIG. 13, a state in which two coils 3e, 3b are connected in series between the first commutator segments 8c, 8a is established.

As explained above, with the lines 114a-114f in the wiring board 11, it is possible to place the first commutator segments 8a-8c, the second commutator segments 9a-9c, and the coils 3a-3f in a state in which points of the same phase are wired and in which points of the same electrical potential are wired.

Figure 14:
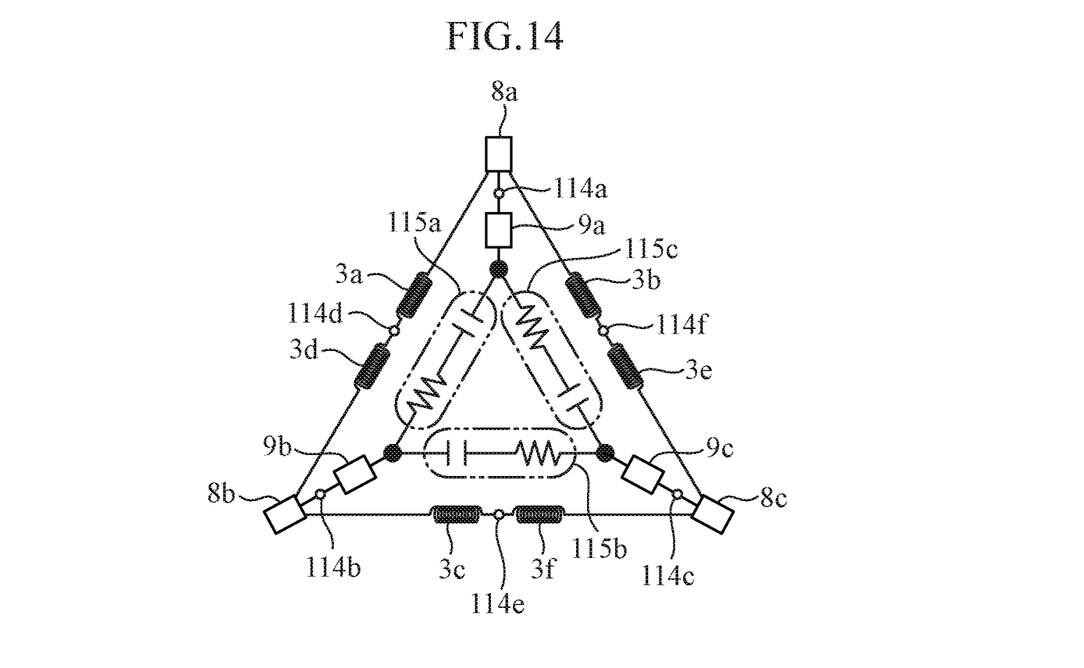
FIG. 14 is an explanatory diagram for illustrating another example of electrical connection among the coils and the commutator segments in accordance with Embodiment 1 of the present invention.

Note that, as shown in FIG. 14, by connecting individual resistance elements and individual capacitors among the second metal pieces 91a-91c, so-called "snubber circuits" may be configured among the second commutator segments 9a-9c. Each resistance element and capacitor of the snubber circuits 115a-115c are respectively provided by the electronic components 113a, 113b provided on the wiring board 11.

Hereinafter, in the present invention, the first terminals 4a-4f and the second terminals are collectively referred to as "terminals". One end portions 31a-31f and the other end portions 32a-32f of the wires of the coils 3a-3f are collectively referred to as "end portions". The first commutator segments 8a-8c and the second commutator segments 9a-9c are collectively referred to as "commutator segments". The first metal pieces 81a-81c, 82a-82c and the second metal pieces 83a-83c, 91a-91c are collectively referred to as "metal pieces".

Next, a brush motor including the rotor 200 configured as explained above will be explained.

A stator (not shown) provided with magnets is arranged so as to face the outer peripheral portion of the core 1. In addition, brushes (not shown) for supplying electric power to the commutator segments 8a-8c, 9a-9c are provided so as to come into contact with the outer peripheral portion of the commutator 6. The brush motor is constituted by the rotor 200, the stator, and the brushes.

Next, an operation of the brush motor, and effects of the rotor 200 in accordance with Embodiment 1 will be explained.

First, a power supply unit (not shown) applies a voltage to the brushes. By providing electric power from the brushes to the commutator segments 8a-8c, 9a-9c, electric current flows in the corresponding coils 3a-3f. When the electric current flows in the coils 3a-3f, the coils generate a magnetic field. Magnetic forces between the coils 3a-3f of the rotor 200 and the magnets of the stator cause the rotor 200 to rotate with respect to the stator.

In response to a rotational movement of the rotor 200, the commutator segments 8a-8c, 9a-9c alternately come into contact with the brushes, and the coils in which the electric current flows are switched. Thus, the rotor 200 continues to rotate with respect to the stator.

No conventional rotor for a brush motor includes the terminals 4a-4f, 5a-5f, the metal pieces 81a-81c, 82a-82c, 83a-83c, 91a-91c, the resin molded portion 10, and the wiring board 11 according to Embodiment 1, and the end portions of the wires of the coils are drawn out from the bobbins to the commutator and hooked to the commutator segments. Thus, there is a problem that the wires are likely to be broken because of the inertial force applied to the wires due to the rotation of the rotor, the difference between the resonant state of the core and the resonant state of the commutator induced by vibration of the rotor and so on.

In contrast, in the rotor 200 in accordance with Embodiment 1, the terminals 4a-4f, 5a-5f are provided on the bobbins 2a-2f, the end portions 31a-31f, 32a-32f of the wires are hooked to the terminals 4a-4f, 5a-5f, and the wires and the commutator segments 8a-8c, 9a-9c are electrically connected via the metal pieces 81a-81c, 82a-82c, 83a-83c, 91a-91c extending from the commutator segments 8a-8c, 9a-9c and via the wiring board 11. Thus, it is possible to eliminate the necessity of drawing the wires out of the bobbins 2a-2f to the commutator 6, and reduce the likelihood of the breakage of the wires.

In addition, in the conventional rotor for the brush motor, when a plurality of the wires is fixed to one commutator segment to electrically connect therebetween, the plurality of wires is fused to the one commutator segment in a state in which the plurality of wires is hooked to a hook of the one commutator segment. Thus, there is a problem that fusing work is difficult to perform, and that a fixed state and an electrical connection state at the fused portion are unstable.

In contrast, in the rotor 200 in accordance with Embodiment 1, one of the first terminals 4a-4f and one of the second terminals 5a-5f are provided on each of the bobbins 2a-2f, one end portions 31a-31f and the other end portions 32a-32f of the wires are hooked and fused to the corresponding first terminals 4a-4f and the second terminals 5a-5f, respectively. In addition, each of the first commutator segments 8a-8c includes two of the first metal pieces 81a-81c, 82a-82c, and each of the tip portions of the first metal pieces is in contact with a different first terminal 4a-4f. Thereby, it is possible to connect two wires to each one of the first commutator segments 8a-8c without providing the fused portion at which two or more wires are hooked to one point. Thereby, it is possible to make the fusing work easier. In addition, it is possible to stabilize the fixed state and the electrical connection state at the fused portion to enhance the structural strength of the rotor 200.

Further, in the conventional rotor for the brush motor, the commutator segments are electrically connected to one another by winding electrical wires around the outer peripheral portion of the rotor. Therefore, there is a problem that it is difficult to automate a manufacturing line because it requires a step of winding the electrical wires manually in manufacturing the brush motor.

In contrast, in the rotor 200 in accordance with Embodiment 1, the commutator segments 8a-8c and the commutator segments 9a-9c are electrically connected via the second metal pieces 83a-83c, 91a-91c extending from the commutator segments 8a-8c, 9a-9c and via the wiring in the wiring board 11. Thus, it is possible to eliminate the step of winding the wires around the outer peripheral portion of the rotor 200 in manufacturing the brush motor, automate the manufacturing line for the brush motor, and reduce manufacturing costs. In particular, since only a step of attaching the wiring board 11 is required, it is suitable for automation.

In addition, in the rotor 200 in accordance with Embodiment 1, the core 1, commutator 6, and the shaft 7 are integrally formed by insert molding. Thereby, generation of the difference between the resonant state of the core 1 and the resonant state of the commutator 6 is suppressed during the rotation of the rotor 200, and thus vibration resistance properties of the rotor 200 can be improved.

Further, in the rotor 200 in accordance with Embodiment 1, the wiring board 11 is not included as the objects of insert molding, and the resin molded portion 10 is interposed between the wiring board 11 and the coils 3a-3f. Thereby, heat generated by flowing the electric current in the coils 3a-3f is less likely to be transmitted to the wiring board 11. Accordingly, the wiring board 11 may be made of a member having relatively low heat resistance properties such as an electronic circuit board. Further, by adopting the wiring board 11, it is possible to easily incorporate the snubber circuits into the rotor 200, as explained above.

The brush motor including the rotor 200 can be used for any application of a general motor. Especially, the brush motor including the rotor 200 is suitable for an on-vehicle brush motor because it has the properties that the wires are less likely to be broken, has the properties of high structural strength and vibration resistance, and has properties that the heat generated in the coils 3a-3f is less likely to be transmitted to the wiring board 11, as explained above. More specifically, it can be used for, for example, open and close control of a wastegate (WG) valve of an engine or an exhaust gas recirculation (EGR) valve of an engine.

Note that shapes and structures of the hooks 41a-41f, 51a-51f may be any shapes and structures as long as the end portions 31a-31f, 32a-32f of the wires of the coils 3a-3f can be hooked thereto, and the shapes and structures of the hooks are not limited to the shapes and structures shown in FIGS. 1 to 7.

In addition, a shape of each of the second metal pieces 83a-83c, 91a-91c is not limited to the L-shape. It may be any shape as long as it can penetrate through the resin molded portion 10 and the tip portion thereof can project from the wiring board mounting surface 101.

Moreover, when the snubber circuits are not required, the electronic components 113a, 113b may not be provided on the wiring board 11 and the component placement recesses 104a, 104b may not be formed in the resin molded portion 10. In this case, the electrical connection state among the coils 3a-3f and the commutator segments 8a-8c, 9a-9c is a state shown in FIG. 13.

Further, the wiring board 11 may be an electronic circuit board of a single layer, and it may be made of a copper plate.

Furthermore, a way of winding the coils 3a-3f is not limited to the concentrated winding. The coils may be so-called "distributed windings" coils in which the wires are wound across a plurality of bobbins. In this case, only one of the first terminal and the second terminal may be provided on each of the bobbins.

In addition, a shape of the core 1 may be any shape as long as it has a shape used for an ordinary brush motor. Moreover, the brush motor of the present invention is not limited to a 6-pole motor, and the motor may have any number of poles.

Further, the number of the first metal pieces 81a-81c, 82a-82c included in each of the first commutator segments 8a-8c is not limited to two. Depending on the number of poles of the brush motor and so on, three or more first metal pieces may be included.

As explained above, the rotor 200 in accordance with Embodiment 1 includes: the coils 3a-3f formed by winding the electrical wires around the bobbins 2a-2f of the core 1; the terminals 4a-4f, 5a-5f provided for the bobbins 2a-2f and to which the end portions 31a-31f, 32a-32f of the wires are hooked; and the commutator 6 arranged at the end portion of the core 1 on the side where the terminals 4a-4f, 5a-5f are provided. The terminals 4a-4f, 5a-5f and the commutator segments 8a-8c, 9a-9c of the commutator 6 are electrically connected via the metal pieces 81a-81c, 82a-82c, 83a-83c, 91a-91c extending from the commutator segments 8a-8c, 9a-9c and via the wiring board 11. By providing the terminals 4a-4f, 5a-5f on the bobbins 2a-2f, hooking the end portions 31a-31f, 32a-32f of the wires thereto, and electrically connecting the wires and the commutator segments 8a-8c, 9a-9c via the metal pieces 81a-81c, 82a-82c, 83a-83c, 91a-91c extending from the commutator segments 8a-8c, 9a-9c and via the wiring board 11, it is possible to eliminate the necessity of drawing out the wires from the bobbins 2a-2f to the commutator 6 and reduce the likelihood of the breakage of the wires.

In addition, the terminals 4a-4f, 5a-5f include the first terminals 4a-4f to which one end portions 31a-31c of the wires are hooked, and the second terminals 5a-5f to which other end portions 32a-32c of the wires are hooked and which are connected to the wiring board 11. The metal pieces 81a-81c, 82a-82c, 83a-83c, 91a-91c include the first metal pieces 81a-81c, 82a-82c which are in contact with the first terminals 4a-4f, and the second metal pieces 83a-83c, 91a-91c which are connected to the wiring board 11. By adopting the configuration in which the first terminals 4a-4f and the second terminals 5a-5f are provided on the bobbins 2a-2f, one end portions 31a-31f of the wires are hooked to the first terminals 4a-4f, respectively, and other end portions 32a-32f of the wires are hooked to the second terminals 5a-5f, respectively, it is possible to make the fusing work easier. In addition, it is possible to stabilize the fixed state and the electrical connection state at the fused portion to enhance the structural strength of the rotor 200.

In addition, the commutator segments 8a-8c, 9a-9c include the first commutator segments 8a-8c having the first metal pieces 81a-81c, 82a-82c and the second metal pieces 83a-83c, and the second commutator segments 9a-9c having the second metal pieces 91a-91c. Each of the first commutator segments 8a-8c includes the plurality of first metal pieces 81a-81c, 82a-82c, and each of the tip portions thereof is in contact with a different first terminal among the first terminals 4a-4f. Since each of the first commutator segments 8a-8c includes the plurality of first metal pieces 81a-81c, 82a-82c and each of the tip portions thereof is in contact with a different first terminal among the first terminals 4a-4f, it is possible to eliminate the fused portion where the plurality of wires is hooked at one point even in a case in which two or more wires are connected to one of the first commutator segments 8a-8c.

In addition, the first metal pieces 81a-81c, 82a-82c and the first terminals 4a-4f are made of pure copper, and the tip portions of the first metal pieces 81a-81c, 82a-82c are welded to the first terminals 4a-4f. Since the first metal pieces 81a-81c, 82a-82c and the first terminals 4a-4f are made of pure copper, it is possible to suppress generation of soot during the TIG welding.

Further, the rotor 200 includes the resin molded portion 10 provided on the outer peripheral portion of the core-side end portion of commutator 6. The second terminals 5a-5f and the second metal pieces 83a-83c, 91a-91c penetrate through the resin molded portion 10, and the tip portions thereof project from the wiring board mounting surface 101 of the resin molded portion 10. The wiring board 11 is mounted on the wiring board mounting surface 101. By interposing the resin molded portion 10 between the wiring board 11 and the coils 3a-3f, it is possible that the heat generated by flowing the electric current in the coils 3a-3f is less likely to be transmitted to the wiring board 11.

Further, the wiring board 11 is the electronic circuit board, and the snubber circuits are constituted by the electronic components provided on the electronic circuit board. The snubber circuits can absorb high voltage (so-called "surge voltage") that is generated when the commutator segments touching to the brushes are switched.

Furthermore, the rotor 200 includes the shaft 7 that penetrates through the internal spaces of the core 1 and the commutator 6. The core 1, the commutator 6, and the shaft 7 are integrally formed by insert molding. Thereby, the generation of the difference between the resonant state of the core 1 and the resonant state of the commutator 6 is suppressed during the rotation of the rotor 200, and thus the vibration resistance property of the rotor 200 can be improved.

Embodiment 2

Figure 15:
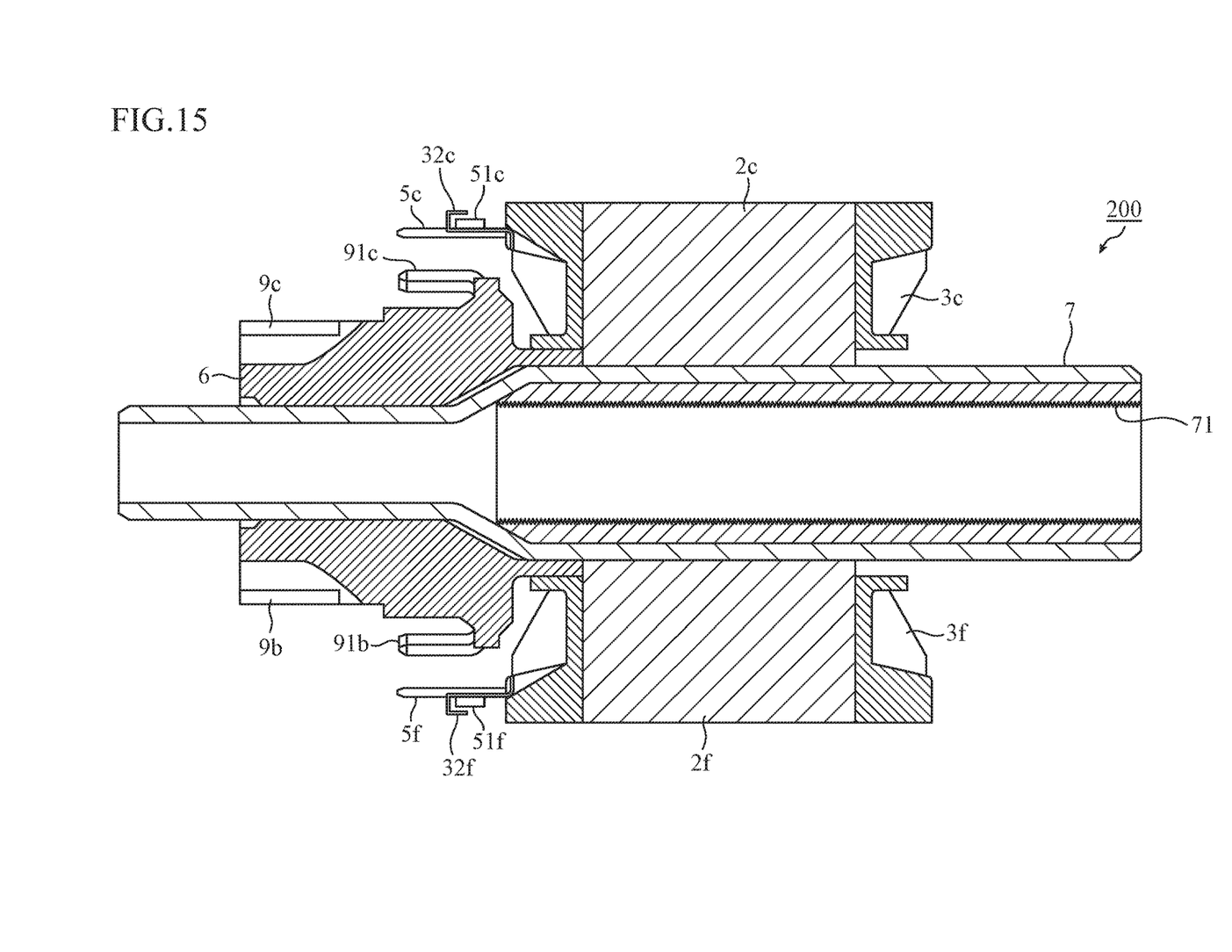
FIG. 15 is a cross-sectional view of a core, bobbins, coils, a commutator, and a shaft in accordance with Embodiment 2 of the present invention.

With reference to FIG. 15, a rotor 200 in which a female thread portion 71 is formed on an inner peripheral portion of the shaft 7 will be explained. Since components other than the shaft 7 are the same as those in Embodiment 1, the same reference numerals are given to the same components and explanation thereof will be omitted.

The shaft 7 is made of metal, and has a hollow structure as shown in FIG. 15. The core 1 in which the coils 3a-3f are wound around the bobbins 2a-2f, the commutator 6, and the shaft 7 are manufactured as separate members, and they are integrated by insert molding. The resin molded portion 10 and the female thread portion 71 on the inner peripheral portion of the shaft 7 are formed of the resin used in the insert molding.

The rotor 200 in accordance with Embodiment 2 is particularly suitable for use in an actuator that converts a rotary motion of the rotor 200 to a linear motion. That is, a linear shaft having a bar-shape is penetrated through the hollow interior of the shaft 7, and a male thread portion provided on an outer periphery portion of the linear shaft is engaged with the female thread portion 71. Thereby, when the rotor 200 rotates with respect to the stator (not shown), the linear shaft moves along an axial direction of the linear shaft with respect to the brush motor.

By incorporating, into the shaft 7, a mechanism for converting the rotary motion of the rotor 200 to the linear motion, it is possible to eliminate the necessity of installing such a mechanism outside the brush motor, and thus the number of overall actuator components can be reduced. Further, since the female thread portion 71 and the resin molded portion 10 are formed of the resin used in the insert molding, it is possible to reduce the number of steps for manufacturing the brush motor, and thus the manufacturing cost of the brush motor can be reduced.

Note that it is to be understood that the above-mentioned embodiments can be freely combined, various changes can be made for any component in each of the above-mentioned embodiments, and any optional components in each of the above-mentioned embodiments can be omitted within the scope of the invention.

INDUSTRIAL APPLICABILITY

With the rotor for the brush motor according to the present invention, it is possible to reduce the likelihood of breakage of wires. Thus, the rotor for the brush motor is suitable to be used in an on-vehicle brush motor, for example, for example, for performing opening and closing control of the WG valve or the EGR valve of an engine

REFERENCE SIGNS LIST 1 core, 2a-2f bobbin, 3a-3f coil, 4a-4f first terminal (terminal), 5a-5f second terminal (terminal), 6 commutator, 7 shaft, 8a-8c first commutator segment (commutator segment), 9a-9c second commutator segment (commutator segment), 10 resin molded portion, 11 wiring board, 31a-31f one end portion (end portion), 32a-32f other end portion (end portion), 41a-41f hook, 51a-51f hook, 71 female thread portion, 81a-81c first metal piece (metal piece), 82a-82c first metal piece (metal piece), 83a-83c second metal piece (metal piece), 91a-91c second metal piece (metal piece), 101 wiring board mounting surface, 102 terminal block, 103 reference pin, 104a, 104b component placement recess, 111 first through-hole, 112 second through-hole, 113a, 113b electronic component, 114a-114f line, 115a-115c snubber circuit, 200 rotor.

The invention claimed is:

1. A rotor for a brush motor comprising:
   a plurality of coils formed by winding wires around bobbins of a core;
   a plurality of terminals provided on one of the bobbins, wherein an end portion of each wire is hooked to each of the plurality of terminals; and
   a commutator arranged at an end portion of the core on a side where the terminals are provided,
   wherein the terminals and commutator segments of the commutator are electrically connected via metal pieces extending from the commutator segments and a wiring board, and
   wherein
   each terminal includes a first terminal to which one end portion of one of the wires is hooked, and a second terminal to which the other end portion of the one of the wires is hooked, the second terminal being connected to the wiring board, and
   the metal pieces include a first metal piece that is in contact with the first terminal, and a second metal piece that is connected to the wiring board.

2. The rotor for the brush motor according to claim 1, wherein
   the metal pieces further include a third metal piece that is connected to the wiring board,
   the commutator segments include a plurality of first commutator segments each including the first metal piece and the second metal piece, and a plurality of second commutator segments each including the third metal piece,
   each first commutator segment includes a plurality of the first metal pieces whose tip portion is in contact with one of the first terminals different from each other.

3. The rotor for the brush motor according to claim 2, wherein
   the first metal piece and the first terminal are made of pure copper, and
   the tip portion of the first metal piece is welded to the first terminal.

4. The rotor for the brush motor according to claim 1, wherein the metal pieces further include a third metal piece that is connected to the wiring board,
   the rotor further comprising a resin molded portion provided on an outer periphery portion of an end portion of the commutator on a side where the core is arranged, wherein
   the second terminal and the second metal piece and the third metal piece penetrate through the resin molded portion in such a way that a tip portion of the second terminal and a tip portion of the second metal piece project from a wiring board mounting surface of the resin molded portion, and
   the wiring board is mounted on the wiring board mounting surface.

5. The rotor for the brush motor according to claim 4, wherein the wiring board is an electronic circuit board.

6. The rotor for the brush motor according to claim 5, wherein a snubber circuit is constituted with electronic components provided on the electronic circuit board.

7. The rotor for the brush motor according to claim 4, wherein the core and the commutator are integrally formed by insert molding, and the resin molded portion is made of resin used in the insert molding.

8. The rotor for the brush motor according to claim 1, further comprising a shaft penetrating through an internal space of the core and an internal space of the commutator,
   wherein the core, the commutator, and the shaft are integrally formed by insert molding.

9. The rotor for the brush motor according to claim 8, wherein the shaft has a hollow structure, and is provided with a female thread portion made of resin that is used in the insert molding on an inner peripheral portion of the shaft.

10. The rotor for the brush motor according to claim 1, wherein the coils are concentrated winding type coils.

11. An on-vehicle brush motor including the rotor for the brush motor according to claim 1.

* * * * *